United States Patent
Shekhar et al.

(10) Patent No.: US 8,923,277 B1
(45) Date of Patent: Dec. 30, 2014

(54) METHODS AND APPARATUS RELATED TO FLEXIBLE PHYSICAL INTERFACE NAMING IN A DISTRIBUTED SWITCH FABRIC SYSTEM

(75) Inventors: Ravi Shekhar, Sunnyvale, CA (US); Quaizar Vohra, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 480 days.

(21) Appl. No.: 12/968,886

(22) Filed: Dec. 15, 2010

(51) Int. Cl.
*H04L 12/28* (2006.01)

(52) U.S. Cl.
USPC ........... 370/352; 370/401; 709/223; 709/224; 709/225; 709/220; 709/221

(58) Field of Classification Search
USPC .......................................................... 370/399
See application file for complete search history.

(56) References Cited

U.S. PATENT DOCUMENTS

| | | | | |
|---|---|---|---|---|
| 4,608,684 A * | 8/1986 | Upp | ............................... | 370/368 |
| 5,400,325 A * | 3/1995 | Chatwani et al. | ............. | 370/399 |
| 5,452,297 A * | 9/1995 | Hiller et al. | ............... | 370/395.61 |
| 5,953,330 A * | 9/1999 | Canniff et al. | ................ | 370/352 |
| 6,069,895 A * | 5/2000 | Ayandeh | ....................... | 370/399 |
| 6,151,324 A * | 11/2000 | Belser et al. | .................... | 370/397 |
| 6,259,693 B1 * | 7/2001 | Ganmukhi et al. | ............ | 370/366 |
| 6,711,171 B1 * | 3/2004 | Dobbins et al. | ............... | 370/400 |
| 6,917,986 B2 * | 7/2005 | Mor et al. | ...................... | 709/238 |
| 6,976,088 B1 * | 12/2005 | Gai et al. | ....................... | 709/238 |
| 7,068,666 B2 * | 6/2006 | Foster et al. | .................. | 370/397 |
| 7,068,667 B2 * | 6/2006 | Foster et al. | .................. | 370/398 |
| 7,184,917 B2 * | 2/2007 | Pramanick et al. | ........... | 702/120 |
| 7,185,174 B2 * | 2/2007 | Stewart et al. | .................. | 712/11 |
| 7,200,145 B1 * | 4/2007 | Edsall et al. | .................... | 370/389 |
| 7,249,186 B1 * | 7/2007 | Sitaraman et al. | ............ | 709/229 |
| 7,289,513 B1 | 10/2007 | Medved et al. | | |
| 7,515,594 B2 * | 4/2009 | Chang | ........................... | 370/397 |
| 7,606,239 B2 * | 10/2009 | Maveli et al. | .................. | 370/398 |
| 7,639,605 B2 * | 12/2009 | Narayanan et al. | ........... | 370/219 |
| 7,660,239 B2 * | 2/2010 | Willhite et al. | ................ | 370/225 |
| 7,720,076 B2 * | 5/2010 | Dobbins et al. | .......... | 370/395.53 |
| 7,848,264 B1 * | 12/2010 | Gai et al. | ....................... | 370/256 |
| 7,889,741 B1 * | 2/2011 | Panwar et al. | ................. | 370/392 |
| 8,077,730 B2 * | 12/2011 | Maveli et al. | .................. | 370/398 |
| 8,125,985 B1 * | 2/2012 | Aybay et al. | ................... | 370/359 |
| 8,255,496 B2 * | 8/2012 | Shukla et al. | .................. | 709/220 |
| 8,279,863 B2 * | 10/2012 | Shenoy et al. | ................. | 370/388 |
| 2004/0004966 A1 * | 1/2004 | Foster et al. | .................. | 370/399 |
| 2005/0063395 A1 * | 3/2005 | Smith et al. | .................... | 370/399 |
| 2009/0304010 A1 * | 12/2009 | Kurebayashi et al. | ........ | 370/401 |
| 2011/0097082 A1 * | 4/2011 | Bandyopadhyay | ............. | 398/45 |
| 2011/0238816 A1 * | 9/2011 | Vohra et al. | .................... | 709/224 |
| 2012/0128004 A1 * | 5/2012 | Aybay et al. | ................... | 370/401 |
| 2012/0155320 A1 * | 6/2012 | Vohra et al. | .................... | 370/254 |

* cited by examiner

*Primary Examiner* — Ian N Moore
*Assistant Examiner* — Lakeram Jangbahadur
(74) *Attorney, Agent, or Firm* — Cooley LLP

(57) ABSTRACT

In some embodiments, a switch fabric system includes a compute device to communicate with a network control entity at an access switch from a set of access switches that are coupled to each other via a switch fabric. The compute device stores a map between a physical identifier of a port of the access switch and both a logical identifier of the network control entity and a logical identifier of the port. The compute device can forward to the network control entity, based on the map, configuration information that references the port by the logical identifier of the port.

18 Claims, 6 Drawing Sheets

400 →

| P Chassis ID 410 | P Slot ID 420 | P Group ID 430 | P Port ID 440 |

| L Slot ID 510 | L Group ID 520 | L Port ID 530 |

FIG. 6

Database 600

| P Chassis 610 | P Slot 620 | P Group 630 | P Port 640 | NCE 650 | L Identifier 660 | | |
|---|---|---|---|---|---|---|---|
| | | | | | L Slot | L Group | L Port |
| P Chassis 1 | P Slot 1 | P Group 1 | P Port 1 | NCE 1 | L Slot 1 | L Group 1 | L Port 1 |
| | | P Group 2 | P Port 1 | NCE 5 | L Slot 2 | L Group 1 | L Port 5 |
| | P Slot 2 | P Group 1 | P Port 2 | NCE 7 | L Slot 1 | L Group 2 | L Port 1 |
| | | | P Port 1 | NCE 4 | L Slot 3 | L Group 4 | L Port 3 |
| | | | P Port 2 | NCE 1 | L Slot 1 | L Group 1 | L Port 2 |
| | ... | | | | | | |
| | P Slot M | P Group 1 | P Port 1 | NCE 3 | L Slot 1 | L Group 1 | L Port 3 |
| P Chassis 2 | P Slot 1 | P Group 2 | P Port 1 | NCE 5 | L Slot 2 | L Group 1 | L Port 6 |
| | | | P Port 2 | NCE 7 | L Slot 1 | L Group 2 | L Port 8 |
| | P Slot 2 | P Group 1 | P Port 1 | NCE 1 | L Slot 1 | L Group 1 | L Port 2 |
| | | | P Port 1 | NCE 2 | L Slot 1 | L Group 1 | L Port 9 |
| | P Slot 3 | P Group 1 | P Port 2 | NCE 5 | L Slot 2 | L Group 1 | L Port 4 |
| | | P Group 2 | P Port 2 | NCE 7 | L Slot 1 | L Group 2 | L Port 2 |
| | ... | | | | | | |
| | P Slot M | P Group 1 | P Port 1 | NCE 3 | L Slot 1 | L Group 1 | L Port 3 |
| P Chassis N | P Slot 1 | P Group 2 | P Port 2 | NCE 7 | L Slot 1 | L Group 2 | L Port 1 |
| | P Slot 2 | P Group 1 | P Port 1 | NCE 4 | L Slot 3 | L Group 4 | L Port 3 |
| | ... | | | | | | |
| | P Slot M | P Group 1 | P Port 1 | NCE 3 | L Slot 1 | L Group 1 | L Port 3 |

METHODS AND APPARATUS RELATED TO FLEXIBLE PHYSICAL INTERFACE NAMING IN A DISTRIBUTED SWITCH FABRIC SYSTEM

BACKGROUND

Some embodiments described herein relate generally to switch fabric systems, and, in particular, to a flexible physical interface naming scheme in a distributed switch fabric system.

Some known networking systems include a centralized control plane that can manage resources connected within that networking system. For example, the centralized control plane in such known networking systems can maintain a database associated with the physical location of the resources. Additionally, the centralized control plane can manage forwarding-state information associated with the resources. Such a centralized control plane, however, can become extremely large and unmanageable when a large number of resources are connected within the networking system.

Other known networking systems include a distributed control plane. The distributed control plane in such known networking systems can be implemented at various nodes within the respective networking system. The distributed control plane in such known networking systems, however, is not dynamically configured. As such, some nodes within these networking systems can be largely under-utilized while other nodes within these networking systems can be over-utilized. Additionally, such known networking systems can assign identifiers and/or addresses to ports and/or line cards associated with the physical arrangement of the networking systems. Such a naming scheme can limit the flexibility of the distributed control plane. Accordingly, such networking systems do not operate as efficiently as possible.

Accordingly, a need exists for a networking system having a distributed control plane with a flexible naming scheme that provides flexibility to the nodes within the distributed control plane.

SUMMARY OF THE INVENTION

In some embodiments, a switch fabric system includes a compute device to communicate with a network control entity at an access switch from a set of access switches that are coupled to each other via a switch fabric. The compute device stores a map between a physical identifier of a port of the access switch and both a logical identifier of the network control entity and a logical identifier of the port. The compute device can forward to the network control entity, based on the map, the logical identifier of the port and configuration information that references the port by the logical identifier of the port.

BRIEF DESCRIPTION OF THE DRAWINGS

FIG. 5 is a schematic illustration of a physical identifier of a port of an access switch, according to another embodiment.

FIG. 6 is a schematic illustration of a logical identifier of a port of an access switch, according to another embodiment.

FIG. 7 is a schematic illustration of a database storing an association between a physical identifier of a port, a network control entity and a logical identifier of the port.

DETAILED DESCRIPTION

Figure 1:
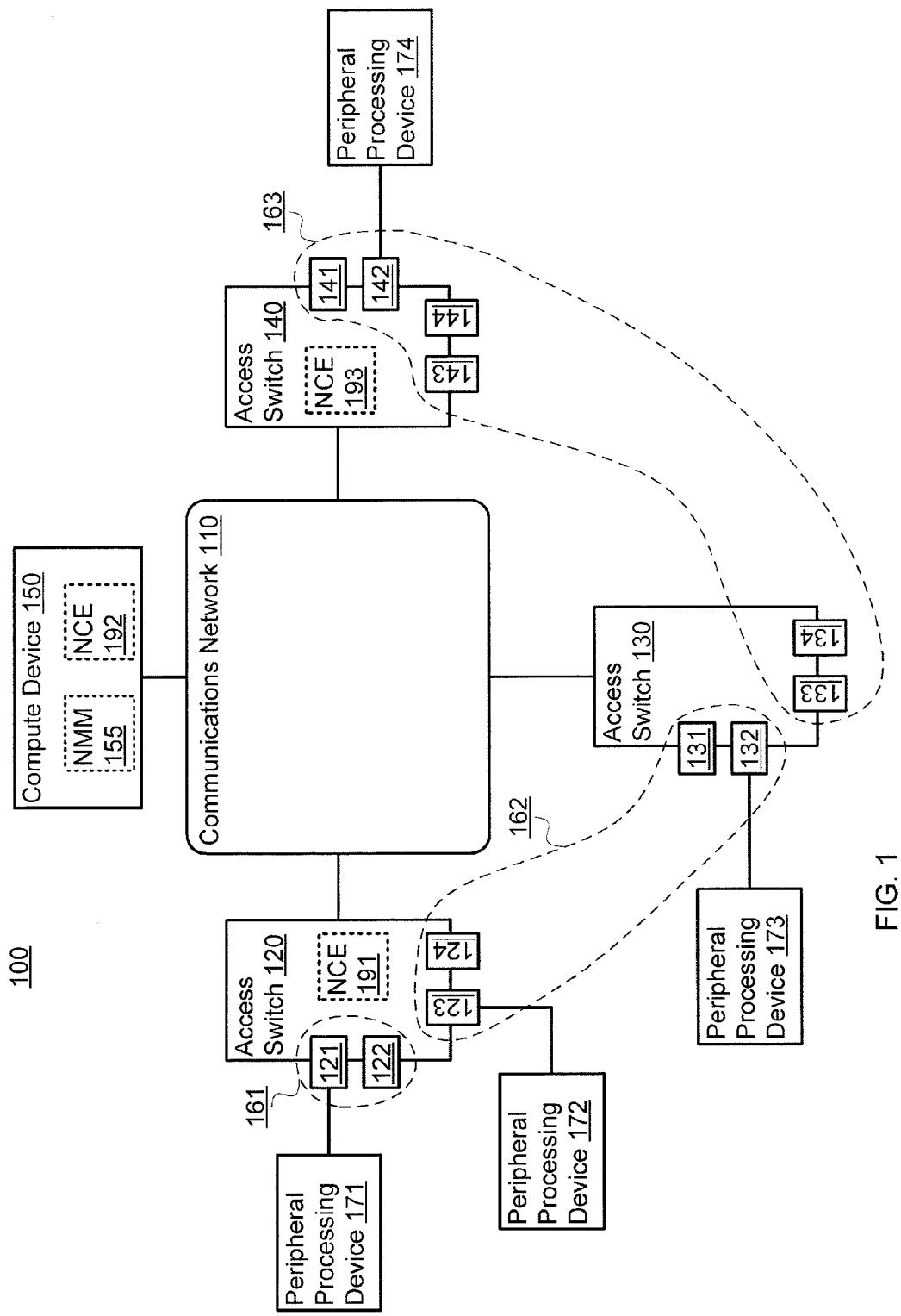
FIG. 1 is a schematic illustration of a switch fabric system, according to an embodiment.

In some embodiments, a switch fabric system includes a compute device to communicate with a network control entity at an access switch from a set of access switches that are coupled to each other via a switch fabric. The compute device stores a map between a physical identifier of a port of the access switch and both a logical identifier of the network control entity and a logical identifier of the port. The compute device can forward to the network control entity, based on the map, the logical identifier of the port and configuration information that references the port by the logical identifier of the port.

In such embodiments, a user (e.g., network administrator) can provide configuration information (e.g., port protocol information, network segment assignment information, port assignment information, peripheral processing device information, policies and/or rules to be implemented at a port, etc.) to the switch fabric system. The user can identify the port to which the configuration information pertains using the physical identifier of that port. Based on the map, the network management module can ensure that the configuration information is sent to the network control entity that manages and/or controls the identified port. Additionally, based on the map, the network management module can send a logical identifier of the port such that the network control entity can implement, associate, execute and/or apply the configuration information to the correct port. Such a switch fabric system has a distributed control plane with network control entities that are not bound by the physical topology of the system.

In some embodiments, a non-transitory processor-readable medium storing code represents instructions to cause a processor to receive a request to apply configuration information to a port within a switch fabric system. The configuration information identifies the port using a physical identifier of the port. The physical identifier of the port is associated with a physical topology of the switch fabric system. The code further represents instructions to cause the processor to determine to which network control entity from a set of network control entities to send the configuration information based on a map that represents an association of the physical identifier of the port with a logical identifier of the network control entity and a logical identifier of the port. The code represents instructions to cause the processor to send the configuration information and the logical identifier of the port to the network control entity.

In some embodiments, a switch fabric system includes a set of network control entities and a network management module. Each network control entity from the set of network control entities manages at least one physical port from a set of physical ports. Each physical port from the set of physical ports is associated with a physical identifier associated with a physical topology of the system. The network management module associates each logical port from a set of logical ports to a physical port from the set of physical ports. The network management module stores a table having a map between the physical identifier of each physical port from the set of physical ports and a logical identifier of its associated logical port from the set of logical ports. Each logical identifier is associated with a logical topology of the switch fabric system. The network management module forwards, based on the map, configuration information based on an address associated with the physical identifier of a physical port from the set of physical ports to a network control entity from the set of network control entities associated with the logical identifier of a logical port from the set of logical ports. The configuration information includes the logical identifier of the logical port such that the network control entity from the set of network control entities can manage the physical port from the set of physical ports using the logical port from the set of logical ports. As such, the configuration information can be said to reference an interface (e.g., a port).

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include, for example, a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connected to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-174 and can function as a distributed network switch. The peripheral processing devices 171-174 are operatively coupled to each other by remaining portions of the switch fabric system 100. The peripheral processing devices 171-174 can be, for example, compute nodes, service nodes, routers, and storage nodes, as described in further detail herein. In some embodiments, for example, the peripheral processing devices 171-174 include servers, storage devices, gateways, workstations, compute devices and/or the like.

The peripheral processing devices 171-174 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-174 can be operatively coupled to an access switch 120, 130, 140, as described in further detail herein. As such, the peripheral processing devices 171-174 are configured to send data (e.g., data packets, data cells, etc.) to and receive data from the access switches 120, 130, 140. In some embodiments, each connection between the peripheral processing devices 171-174 and the respective access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device configured to operatively couple peripheral processing devices 171-174 to the communications network 110. In some embodiments, for example, the access switches 120, 130, 140 can be edge devices, input/output modules, top-of-rack devices, network elements and/or the like. Each access switch 120, 130, 140 can be physically located with a chassis of the switch fabric system 100. In some embodiments, for example, each access switch 120, 130, 140 can be located within the same chassis. In other embodiments, each access switch 120, 130, 140 can be located within a different chassis. Structurally, the access switches 120, 130, 140 can function as both source access switches and destination access switches. Accordingly, the access switches 120, 130, 140 can send data (e.g., a data stream of data packets and/or data cells) to and receive data from a data plane portion of the communications network 110, and to and from the respective connected peripheral processing devices 171-174.

Each of the access switches 120, 130, 140 is configured to communicate with the other access switches 120, 130, 140 via a data plane portion of the communications network 110. Specifically, the data plane portion of the communications network 110 is configured to provide any-to-any connectivity between the access switches 120, 130, 140 at relatively low latency. For example, the data plane portion of the communications network 110 can be configured to transmit (e.g., convey) data between access switches 120, 130, 140. In some embodiments, the communications network 110 can have at least hundreds or thousands of ports (e.g., egress ports and/or ingress ports) through which access switches 120, 130, 140 can transmit and/or receive data.

As discussed in further detail herein, the access switches 120, 130, 140 can be configured to host one or more network control entities to manage the ports 121-124, 131-134, 141-144 of the access switches 120, 130, 140. For example, as described in further detail herein, the access switch 120 can host the network control entity 191 to manage the set of ports 161 and the access switch 140 can host the network control entity 193 to manage the set of ports 163. Similarly stated, the network control entity 191 and the network control entity 193 can be processes, applications, virtual machines, and/or some other software module (executing in hardware) or a hardware module that is executed at the access switch 120 and the access switch 140, respectively. As discussed in further detail herein, compute device 150 hosts the network control entity 192 to manage the set of ports 162.

Figure 2:
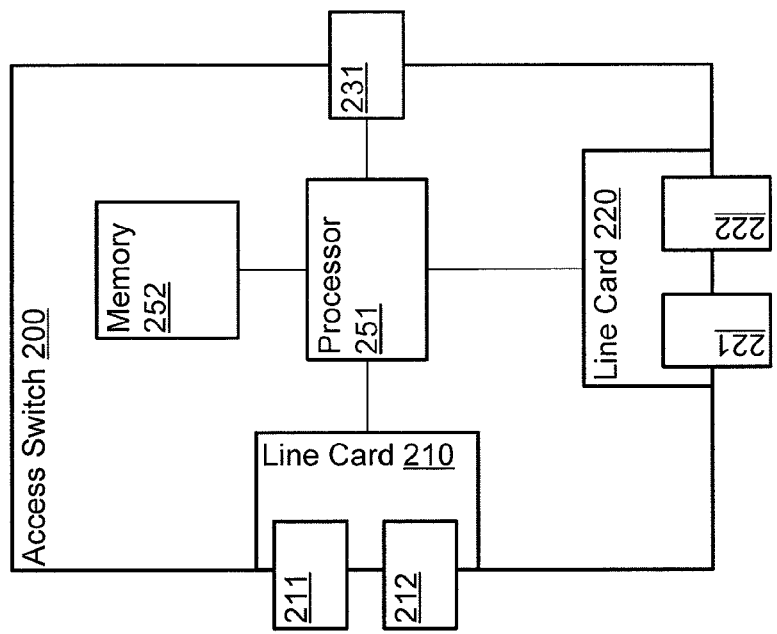
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown). As described in further detail herein, each line card 210, 220 can be disposed within a slot of the access switch 200. In some embodiments, each slot has a physical identifier differentiating each slot on the access switch 200 with the other slots on the access switch 200.

Similar to the ports 121-124, 131-134, 141-144 of the access switches 120, 130, 140 shown in FIG. 1, ports 211, 212, 221 and 222 can be configured to communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can be configured to allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

In some embodiments, the ports 211, 212, 221 and 222 on a line card 210, 220 implementing a first protocol (e.g., Ethernet) can be assigned a first port group identifier and the ports 211, 212, 221 and 222 on the line card 210, 220 implementing a second protocol (e.g., Fibre Channel) can be assigned a second port group identifier. For example, port 211 can implement a first protocol (e.g., Ethernet) and can be assigned a first port group identifier along with other ports (not shown in FIG. 2) on the line card 210 also implementing the first protocol. Similarly, for example, port 212 can implement a second protocol (e.g., Fibre Channel) and can be assigned a second port group identifier along with other ports (not shown in FIG. 2) on the line card 210 also implementing the second protocol. In some embodiments and as described in further detail herein, the ports 211, 212, 221 and 222 can be assigned both a physical port group identifier and a logical port group identifier. In other embodiments, the ports 211, 212, 221, 222 on a line card 210, 220 can group the ports in any other suitable manner. In such embodiments, for example, the ports 211, 212, 221, 222 on each line card 210, 220 can be grouped according to physical location of the ports 211, 212, 221, 222 on the line card 210, 220, size of the ports 211, 212, 221, 222, bandwidth of the ports 211, 212, 221, 222, speed of the ports 211, 212, 221, 222, and/or any other suitable criteria.

Port 231 can be configured to be in communication with other access switches via a communications network such as a switch fabric (e.g., communications network 110). Port 231 can be part of one or more network interface devices (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

In some embodiments, port 231 can implement a different physical layer and/or protocol than those implemented at ports 211, 212, 221 and 222. For example, port 211, 212, 221 and 222 can be configured to communicate with peripheral processing devices using a data link layer protocol based on data packets and port 231 can be configured to communicate via a switch fabric using a data link layer protocol based on data cells. Said differently, access switch 200 can be an edge device of a network switch such as a distributed network switch.

In some embodiments, the access switch 200 can be configured to prepare a data packet (e.g., an Ethernet frame and/or packet) to enter a data plane portion of a communications network (e.g., communications network 110). For example, the access switch 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the access switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, the compute device 150 can be configured to host management modules, processes and/or functions associated with the switch fabric system 100. As shown in FIG. 1, and as described in further detail herein, the compute device 150 can be configured to host a network management module 155 and a network control entity 192.

Figure 3:
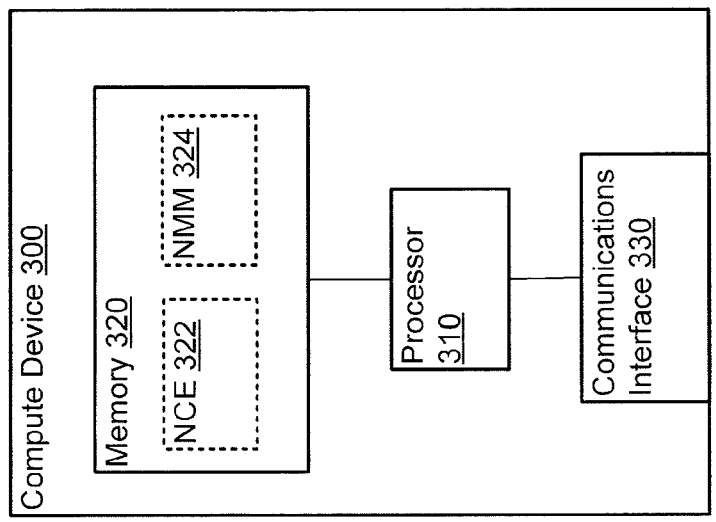
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can be configured to host a network control entity 322 and a network management module 324 similar to the network control entity 194 and the network management module 155, respectively. In other words, network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules (executing in hardware) in addition to network control entity 322 and/or network management module 324. For example, compute device 300 can be a general purpose compute device or compute node that is configured to host multiple processes, applications, virtual machines, and/or software modules.

Returning to FIG. 1, the network management module 155 can divide and/or partition the ports 121-124, 131-134, 141-144 and/or line cards (not shown) of the access switches 120, 130, 140 into the sets of ports 161, 162, 163 to be managed by network control entities 191-193. As such, the network management module 155 can be configured to associate the set of ports 161 with the network control entity 191, the set of ports 162 with the network control entity 192 and the set of ports 163 with the network control entity 193. Additionally, the network management module 155 can also monitor an available processing capacity of each network control entity 191-193 and initiate and/or terminate network control entities 191-193 when the available processing capacity of a network control entity 191-193 crosses (e.g., falls below) a first threshold and/or crosses (e.g., exceeds) a second threshold, respectively. Such initiation and termination of network control entities 191-193 is further described in co-pending U.S. patent application Ser. No. 12/968,848, filed on Dec. 15, 2010, and entitled "Methods and Apparatus for Dynamic Resource Management within a Distributed Control Plane of a Switch," which is incorporated herein by reference in its entirety.

In some embodiments, the network management module 155 can define and/or store (e.g., in a memory) a configuration file associated with configuration information (e.g., port protocol information, network segment assignment information, port assignment information, peripheral processing device information, policies and/or rules to be implemented at a port, etc.) and/or associated with forwarding-state information (e.g., port identifiers, network segment identifiers, peripheral processing device identifiers, etc.) associated with the switch fabric system 100. The configuration information can also reference a port 121-124, 131-134, 141-144 using a logical identifier of that port. Accordingly, as described in further detail herein, a network control entity 191-193 can apply the configuration information to that port.

The network management module 155 can send a portion of the configuration information and/or forwarding-state information associated with a set of ports 161, 162, 163 managed by a particular network control entity 191-193 to that network control entity 191-193. For example, the network management module 155 can send a portion of the configuration file associated with the set of ports 161 to the network control entity 191. In some embodiments, the network management module 155 can send updates to the configuration file (e.g., an update to the configuration information) to the network control entities 191-193 as appropriate.

In some embodiments, the network management module 155 can define, populate and/or store (e.g., in a memory) a table that maps a physical addressing scheme of the switch fabric system 100 (e.g., based on a physical topology of the switch fabric system 100) to a logical naming scheme of the switch fabric system 100 (e.g., based on a logical topology of the switch fabric system 100). For example, each port 121-124, 131-134, 141-144, each set of ports 161, 162, 163 associated with a network control entity 191, 192, 193, each network segment (not shown in FIG. 1), each access switch 120, 130, 140, each line card within an access switch 120, 130, 140, each group of line cards within one or more access switch 120, 130, 140 and/or the like can be assigned a logical identifier and a physical identifier. In some embodiments, the logical identifiers can be assigned by the network management module 155. Such a physical identifier can be used when modifying, defining and/or providing configuration information associated with, for example, a port 121-124, 131-134, 141-144. For example, as described in further detail herein, when a user (e.g., a network administrator) of the switch fabric system 100 provides an instruction (e.g., using a user interface of a configuration device and/or system) to the switch fabric system 100 to assign a port (e.g., port 121) to a particular network segment, the user can identify the port 121 using its physical identifier (e.g., physical chassis identifier, physical slot identifier, physical group identifier, physical port identifier, etc.). Using the table, the network management module 155 can determine which network control entity 191 manages and/or controls that port 121 and send the configuration information to the network control entity 191. In some embodiments, the network management module 155 can also send a logical identifier of the port 121 to the network control entity 191. Using the logical identifier of the port 121, the network control entity 191 can execute, associate, apply and/or implement the configuration information (e.g., assign the port to the particular network segment, apply a particular rule, protocol and/or policy to the port, etc.).

In some embodiments, the network management module 155 updates the table when a port is changed from being associated with a first network control entity to being associated with a second network control entity. For example, if the network management module were to associate port 123 with the network control entity 161 and disassociate port 123 from the network control entity 162, the network management module can update the table accordingly. Thus, the table can maintain current configuration information.

As discussed above, the access switches 120, 130, 140 and/or the compute device 150 can be configured to host network control entities 191, 192, 193 that manage the ports 121-124, 131-134, 141-144 and/or line cards (not shown) of the access switches 120, 130, 140. Each network control entity 191-193 can be a process, application, virtual machine, and/or some other software module (executing in hardware) or a hardware module executed at an access switch 120, 130, 140 or a compute device 150. As such, instructions that implement the network control entity 191-193 can be stored within a memory of an access switch 120, 130, 140 (e.g., memory 252) and executed at a processor of an access switch 120, 130, 140 (e.g., processor 251), or stored within a memory of a compute device 150 (e.g., memory 320) and executed at a processor of a compute device 150 (e.g., processor 310).

Each network control entity 191-193 can manage ports 121-124, 131-134, 141-144 of the access switches 120, 130, 140. For example, network control entity 191 manages the ports 121, 122 associated with the set of ports 161, network control entity 192 manages the ports 123, 124, 131, 132 associated with the set of ports 162 and network control entity 193 manages the ports 133, 134, 141, 142, 143, 144 associated with the set of ports 163. In some embodiments, each network control entity 191-193 can manage and/or maintain forwarding-state information (e.g., port identifiers, network segment identifiers, peripheral processing device identifiers, etc.) associated with its set of ports 161, 162, 163, monitor a state and/or status of peripheral processing devices 171-174 associated with its set of ports 161, 162, 163, implement and/or execute rules and/or policies associated with the ports 121-124, 131-134, 141-144, and/or manage and maintain other information associated with the peripheral processing devices 171-174 and/or ports 121-124, 131-134, 141-144 associated with its set of ports 161, 162, 163. Such forwarding-state information can be used to send data from a first peripheral processing device 171-174 to a second peripheral processing device 171-174. Similarly stated, such forwarding-state information can be used to route and/or forward a data packet and/or cell through a data plane portion of the communications network 110 from a source peripheral processing device 171-174 to a destination peripheral processing device 171-174.

In some embodiments, a network control entity can control and/or manage ports and/or line cards at an access switch at which the network control entity is located (e.g., network control entity 191 manages the set of ports 161). In other embodiments, a network control entity can also control and/or manage ports at an access switch other than the access switch and/or compute device at which the network control entity is located (e.g., network control entity 192 manages ports 123, 124, 131 and 132). In such embodiments, the network management module 155 has flexibility to assign each port 121-124, 131-134, 141-144 to a network control entity 191-193 based on processing capacity. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

Figure 4:
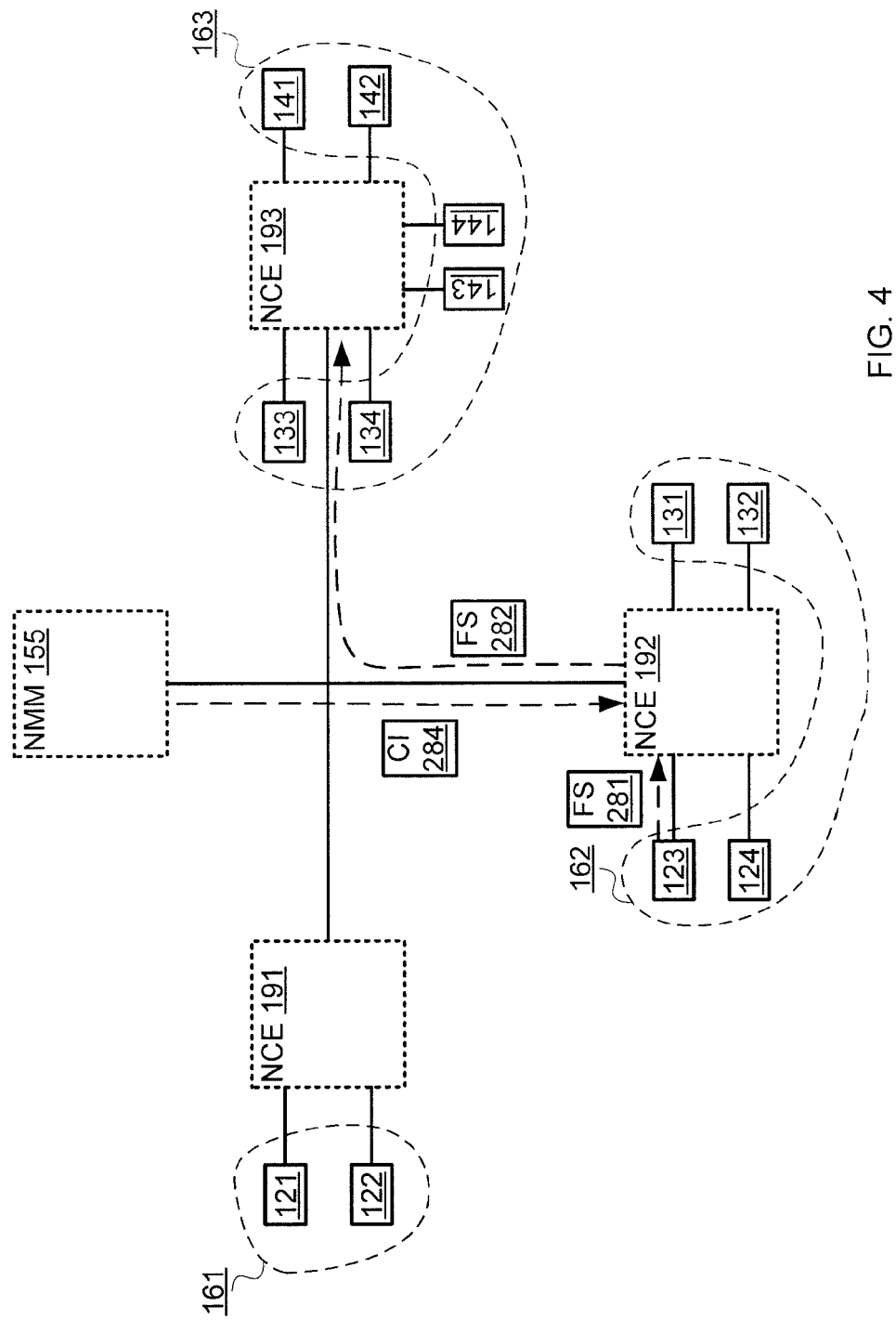
FIG. 4 is a logical representation of a control plane of the switch fabric system of FIG. 1.

FIG. 4, for example, is a block diagram of a logical topology of a control plane of the switch fabric system 100, shown in FIG. 1. The network control entities 191-193 are logically coupled to each other within the control plane. Additionally, the network control entities 191-193 are logically coupled to the network management module 155 within the control plane. As shown in FIG. 1, and as described in further detail herein, such connections can be through a control plane portion of the communications network 110. Thus, the network control entities 191-193 can send control information (e.g., forwarding-state information, configuration information, etc.) to each other via the control plane. Additionally, the network management module 155 can send control information to and receive control information from the network control entities 191-193. For example, as described in further detail herein, network management module 155 can send configuration information 284 associated with the set of ports 162 to the network control entity 192 via the control plane. Accordingly, the network control entities 191-193 and the network management module 155 can store and/or maintain identifiers and/or address associated with the other network control entities 191-193 and the network management module 155.

In some embodiments, and as discussed in further detail herein, each network control entity 191-193 and/or each port 121-124, 131-134, 141-144 can be part of a network segment (e.g., a virtual local area network (VLAN), a virtual switch fabric, etc.). For example, network control entity 192 and network control entity 193 can be part of a first network segment, and network control entity 191 can be part of a second network segment. In such embodiments, each network control entity 191-193 only sends forwarding-state information to the other network control entities within the same network segment. Accordingly, each network control entity 191-193 only stores and/or maintains identifiers and/or addresses associated with the other network control entities 191-193 associated with its network segment. As such, the network control entity 192 sends forwarding-state information to and maintains an identifier and/or address associated with the network control entity 193 but not the network control entity 191. Accordingly, in the above example, the ports 121, 122 associated with the network control entity 191 (associated with the second network segment) do not send data to the ports 123, 124, 131-134, 141-144 associated with the network control entities 192 and 193 (associated with the first network segment).

Returning to FIG. 1, the communications network 110 can be any suitable communications network that operatively couples the access switches 120, 130, 140 to the other access switches 120, 130, 140. Additionally, the communications network 110 can operatively couple the compute device 150 to the access switches 120, 130, 140. In some embodiments, the communications network 110 includes a data plane portion and a control plane portion. In some embodiments, the data plane portion of the communications network 110 includes different physical connections (e.g., cables and/or traces) than the control plane portion of the communications network 110. Similarly stated, in some embodiments, control signals (sent using the control plane portion) are transmitted through the communications network 110 using different physical connections than data signals (sent using the data plane portion). In other embodiments, the data plane portion of the communications network 110 and the control plane portion of the communications network 110 share the same physical connections within the communications network 110. In yet other embodiments, some physical connections within the communications network 110 are shared between the data plane portion of the communications network 110 and the control plane portion of the communications network 110 while others are dedicated to either the data plane portion or the control plane portion.

The control plane portion of the communications network 110 facilitates transmission of control signals (e.g., containing forwarding-state information and/or configuration information) between the network control entities 191-193 and the network management module 155. Accordingly, as described above, the network management module 155 can send configuration information to the network control entities 191-193 via the control plane portion of the communications network 110.

The data plane portion of the communications network 110 facilitates transmission of data between access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can be configured to operate as a single logical entity (e.g., a single logical network element). Similarly stated, the data plane portion of the communications network 110 can define part of a single logical hop between a first access switch 120, 130, 140 and a second access switch 120, 130, 140 (e.g., along with the data paths between the access switches 120, 130, 140 and the data plane portion of the communications network 110). The data plane portion of the communications network 110 can be configured to couple (e.g., indirectly connect, facilitate communication between) the peripheral processing devices 171-174. In some embodiments, the data plane portion of the communications network 110 can be configured to communicate via interface devices (not shown) that can transmit data at a rate of at least 10 Gb/s. In some embodiments, the data plane portion of the communications network 110 can be configured to communicate via interface devices (e.g., Fibre-Channel interface devices) that can transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 and, based on a processing capacity of the network control entities 191-193, assigns each port 121-124, 131-134, 141-144 to a network control entity 191-193. As shown in FIG. 1, for example, the network management module 155 associates ports 121 and 122 (set of ports 161) with the network control entity 191; ports 123, 124, 131 and 132 (set of ports 162) with the network control entity 192; and ports 141, 142, 143, 144, 133 and 134 (set of ports 163) with the network control entity 193. In some embodiments, the network management module 155 can initiate the network control entities 191-193 dynamically based on the processing capacity of the other network control entities 191-193 in the switch fabric system 100. In other embodiments, a user can provide configuration information to the network management module 155, and the network management module 155 can initiate the network control entities 191-193 based on the configuration information.

A user (e.g., a network administrator), for example, of the switch fabric system 100 can provide configuration information associated with the ports 121-124, 131-134, 141-144 of the access switches 120, 130, 140 and/or the line cards of the access switches 120, 130, 140 to the network management module 155. Such configuration information can be provided to the network management module 155 using any suitable input device (e.g., a keyboard, a mouse, etc.) operatively coupled to the network management module 155. For example, a user can input the configuration information at compute device 150 and/or at another compute device operatively coupled to the compute device 150 using any suitable input device operatively coupled to compute device 150 and/or the other compute device.

The user can associate the configuration information with a port 121-124, 131-134, 141-144 using a physical identifier of the port 121-124, 131-134, 141-144 (e.g., an identifier based on a physical topology of the switch fabric system 100). As described in further detail herein, such a physical identifier can include a chassis identifier, a slot identifier, a group identifier, a port identifier and/or any other level of physical identifier that can be used to identify the port 121-124, 131-134, 141-144.

The network management module 155 can receive the configuration information addressed using the physical identifier of the port 121-124, 131-134, 141-144. Based on the information stored in the table that maps the physical addressing scheme of the switch fabric system 100 (e.g., based on a physical topology of the switch fabric system 100) to the logical naming scheme of the switch fabric system 100 (e.g., based on a logical topology of the switch fabric system 100), the network management module 155 can retrieve and/or determine which network control entity 191-193 manages the port 121-124, 131-134, 141-144. Additionally, based on the information stored in the table, the network management module 155 can retrieve a logical identifier associated with the port 121-124, 131-134, 141-144. More specifically, using the physical identifier of the port 121-124, 131-134, 141-144 as a key to the table, the network management module 155 can determine with which network control entity 191-193 the port 121-124, 131-134, 141-144 is associated and a logical identifier (specific to that network control entity 191-193) identifying that port 121-124, 131-134, 141-144.

In other embodiments, the network management module 155 does not receive the configuration information, but instead, receives a request from another module and/or entity within the switch fabric system 100 to translate the physical identifier and/or address of the port 121-124, 131-134, 141-144 into the logical identifier and/or address of the port 121-124, 131-134, 141-144. Based on the physical identifier and/or address of the port 121-124, 131-134, 141-144, the network management module 155 can retrieve the identifier of the network control entity 191-193 with which the port 121-124, 131-134, 141-144 is associated and the logical identifier (specific to that network control entity 191-193) identifying that port 121-124, 131-134, 141-144 from the table. The identifier of the network control entity 191-193 and the logical identifier of the port 121-124, 131-134, 141-144 can be sent to the module requesting the information.

In some embodiments, the logical identifier of the port 121-124, 131-134, 141-144 and the identifier of the network control entity 191-193 managing the port 121-124, 131-134, 141-144 can be concealed to the user providing the configuration information (i.e., the user addressing the configuration information using the physical identifier of the port 121-124, 131-134, 141-144). In such embodiments, the user is aware of the physical topology of the switch fabric system 100 but not the logical topology of the switch fabric system 100. As such, the user does not need to be aware of and/or concerned about the distributed logical topology of the control plane. Similarly stated, the user does not need to be aware of and/or concerned about which network control entity controls which port. Moreover, the user does not need to be aware of and/or concerned about changes to the distributed logical topology of the control plane. For example, the user can provide configuration information to a port and/or group of ports of the switch fabric system 100 based on the physical topology of the switch fabric system 100 (i.e., using the physical address and/or identifier) even if the network control entity 191-193 managing that port has changed.

Additionally, in some embodiments, a second user (a network administrator associated with the logical topology of the switch fabric system 100) can monitor and/or manage the logical topology and/or the logical identifiers associated with the switch fabric system 100 while the user providing the configuration information can monitor and/or manage the physical topology and/or the physical identifiers associated with the switch fabric system 100. In such embodiments, the user providing the configuration information can maintain a legacy physical topology of the system. Similarly stated, because the logical topology of the control plane is not dependent on the physical topology of the switch fabric system 100, the user providing the configuration information can maintain a physical topology of the switch fabric system 100 similar to a physical topology of a system used prior to the switch fabric system 100. Accordingly, the switch fabric system 100 can be easily integrated with legacy systems.

As shown in FIG. 4, the network management module 155 can send configuration information 284 (e.g., a configuration file) to the network control entity 192 based on the configuration information and the physical identifier and/or address entered by the user. In some embodiments, for example, each network control entity 191-193 can receive configuration information 284 (e.g., port protocol information, network segment assignment information, port assignment information, peripheral processing device information, policies and/or rules to be implemented at a port, etc.) from the network management module 155 associated with its associated set of ports 161-163. For example, network control entity 191 can receive configuration information associated with the set of ports 161, network control entity 192 can receive configuration information associated with the set of ports 162 and network control entity 193 can receive configuration information associated with the set of ports 163. Such configuration information 284 can be sent to the network control entities 191-193 with the logical identifier and/or address of the ports 121-124, 131-134, 141-144 to which the configuration information applies.

Each network control entity 191-193 can then implement, execute and/or apply the received configuration information at the applicable port managed by that network control entity 191-193. For example, each network control entity 191-193 can associate a particular port 121-124, 131-134, 141-144 with a network segment and/or apply a policy, protocol and/or rule to the port 121-124, 131-134, 141-144. Such a policy, protocol and/or a rule can be any applicable policy, protocol and/or rule. In some embodiments, for example, a rule implemented, executed and/or applied by the network control entity 192 at the port 131 can ensure that the port 131 does not send date to and/or receive data from the port 133. For another example, a rule can ensure that the port 131 only sends and/or receives a particular type and/or format of data from the port 133. For yet another example, a rule can ensure that the port 131 does not send and/or receive data during a certain time period.

In some embodiments, each network control entity 191-193 can monitor the set of ports 161-163 with which it is associated. For example, each network control entity 191-193 can detect a change in state associated with its associated set of ports 161-163. In some embodiments, for example, a network control entity 191-193 can detect when a peripheral processing device 171-174 is operatively coupled and/or decoupled from a port 121-124, 131-134, 141-144 from its associated set of ports 161-163. In some embodiments, the network control entities 191-193 can send updated forwarding-state information (e.g., port identifiers, network segment identifiers, peripheral processing device identifiers, etc.) to the other network control entities 191-193 based on a change in state at the network control entity 191-193.

As shown in FIG. 4, for example, the network control entity 192 can detect a change in state at the port 123. For example, after the peripheral processing device 172 (FIG. 1) is initially coupled to the port 123, the peripheral processing device 172 can send forwarding-state information 281 associated with the peripheral processing device 172 to the network control entity 192. In some embodiments, such forwarding-state information 281 can include a peripheral processing device identifier associated with the peripheral processing device 172, such as, for example, a media access control (MAC) address, an interne protocol (IP) address, and/or the like.

The network control entity 192 can update and/or revise its configuration table accordingly. The network control entity 192 can then send updated forwarding-state information 282 to the network control entity 193, as shown in FIG. 4. In some embodiments, such forwarding-state information 282 can include, for example, port identifiers of the ports 123, 124, 131, 132 associated with the network control entity 192, a port identifier associated with the updated port 123, a network segment identifier associated with a network segment with which the network control entity 192 is associated, peripheral processing device identifiers (e.g., MAC address, IP address, etc.) associated with the peripheral processing devices 172, 173 operatively coupled to the set of ports 162, a peripheral processing device identifier associated with the updated peripheral processing device 172 and/or the like.

In some embodiments, the network control entity 192 can send the forwarding-state information 282 to the network control entity 193 using a targeted higher level protocol (e.g., an application layer protocol) such as, for example, Boarder Gateway Protocol (BGP). In such embodiments, the network control entity 192 can use such a higher level protocol in conjunction with any suitable lower level protocol (e.g., a data link layer protocol), such as, for example, Ethernet and/or Fibre Channel, to send the forwarding-state information 282. While BGP can be implemented at the application layer, it can be used to send forwarding-state information used to populate a routing table (e.g., at the network control entity 193) associated with a network layer. Using a targeted protocol, such as BGP, the network control entity 192 can send the forwarding-state information 282 to specific network control entities (e.g., 193) while refraining from sending the forwarding-state information to other network control entities (e.g., 191).

In some embodiments, the network control entity 193 can store the forwarding-state information 282 received from the network control entity 192 in a memory associated with the network control entity 193. For example, the network control entity 193 can store the forwarding-state information 282 at the memory (e.g., memory 252) of the access switch 140 at which the network control entity 193 is located. Similarly stated, the network control entity 193 can update a configuration and/or forwarding-state table within the memory of the access switch 140 in response to receiving the forwarding-state information 282. In some embodiments, the forwarding-state information 282 can be stored at a portion of the memory of the access switch 140 allocated and/or partitioned for the network control entity 193.

The network control entity 193 can then send the updated forwarding-state information 282 to data plane modules (not shown in FIG. 1) at the access switches 130, 140 at which ports 133, 134, 141, 142, 143, 144 associated with the network control entity 193 are located. In some embodiments, for example, the network control entity 193 can store the forwarding-state information 282 at a portion of the memory (e.g., within a routing table) of the access switch 140 allocated and/or partitioned for data, processes and/or applications associated with the data plane. In such embodiments, the memory of the access switch 140 can store the forwarding-state information 282 in a portion of the memory associated with the network control entity 193 as well as in a portion of the memory associated with the data plane. In other embodiments, the forwarding-state information 282 is stored within a single location within the memory of the access switch 140 accessible by the applicable processes at the access switch 140 (including the network control entity 193 and the data plane module). The network control entity 193 also sends the forwarding-state information 282 to a data plane module at the access switch 130 (ports 133 and 134 at access switch 130 are associated with the network control entity 193). Similar to the access switch 140, the access switch 130 can store the forwarding-state information within a memory (e.g., within a routing table).

In some embodiments, and as described in further detail herein, the network control entity 191 can be part of a different network segment than the network control entities 192 and 193. In such embodiments, the network control entity 192 can send forwarding-state information 282 to the network control entities (e.g., 193) associated with the same network segment while refraining from sending the forwarding-state information to the network control entities (e.g., 191) associated with another network segment. In such a manner, multiple network segments (e.g., virtual switch fabric systems) can be defined within the switch fabric system 100. In other embodiments, the network control entity 192 also sends the updated forwarding-state information 282 to the network control entity 191. In such embodiments, the network control entity 191 can determine that the updated forwarding-state information 282 relates to a different network segment and, thus, discard the updated forwarding-state information 282.

A data packet (e.g., an Ethernet packet and/or frame, a Fibre Channel packet and/or frame, etc.) can be sent between peripheral processing devices 171-174 using the switch fabric system 100. For example, a data packet can be sent from a source peripheral processing device 174 to a destination peripheral processing device 172. The source peripheral processing device 174 can send the data packet to the access switch 140 through port 142 using a first lower level protocol (e.g., Ethernet, Fibre Channel, etc.).

Based on the forwarding-state information received from the network control entity 193 and stored in a memory (e.g., within a routing table), the access switch 140 can prepare the data packet to enter the data plane portion of the communications network 110. In some embodiments, for example, based on the forwarding-state information, the access switch 140 can add and/or append a header to the data packet having a destination address of the peripheral processing device 172 and/or the port 123. In some embodiments, the access switch 140 can also divide and/or partition the data packet into multiple data cells (e.g., having fixed length payloads) to be sent through the data plane portion of the communications network 110 to the access switch 120.

The data packet and/or cells is/are sent to the access switch 120 through the data plane portion of the communications network 110. The data plane portion of the communications network 110 can route and/or forward the data packet and/or cells based the destination address of the peripheral processing device 172 and/or the port 123. As such, the data plane portion of the communications network 110 can use a second lower level protocol (e.g., a cell based protocol), different than the first lower level protocol (e.g., Ethernet, Fibre Channel, etc.) used to send the data packet from the peripheral processing device 174 to the access switch 140. Accordingly, while the data packet can transverse multiple physical hops when in the data plane portion of the communications network 110, the path between the access switch 140 and the access switch 120 can be a single logical hop from the perspective of the first lower level protocol.

The access switch 120 can receive the data packet and/or cells and prepare the data packet and/or cells to be sent to the peripheral processing device 172 via the port 123. Such preparation can include removing a header having the destination address of the peripheral processing device 172 and/or the port 123 from the data packet and/or cells (i.e., the header appended to the data packet by the access switch 140 and used by the data plane portion of the communications network 110 to route and/or forward the data). In some embodiments, such preparation can also include reconstructing and/or reassembling the data packet from the data cells. More generally, the access switch 120 can prepare the data packet to be sent to the peripheral processing device 172 using the first lower level protocol (e.g., Ethernet, Fibre Channel, etc.). After the data packet is ready, the access switch 120 sends the data packet to the peripheral processing device 172.

FIG. 5 is a schematic illustration of a physical identifier 400 of a port of an access switch, according to another embodiment. Such a physical identifier 400 can be associated with a physical topology of a switch fabric system. Similarly stated, each of the parameters and/or layers associated with the physical identifier 400 identifies a physical aspect, group and/or part of the switch fabric system.

The physical identifier 400 includes a physical chassis identifier 410, a physical slot identifier 420, a physical group identifier 430 and a physical port identifier 440. As such, the physical identifier 400 can be hierarchical. More specifically, the physical chassis identifier 410 can be an identifier of a chassis that is unique within a switch fabric system and the physical slot identifier 420 can be an identifier of a physical slot within a chassis that is unique to that chassis.

Similarly, the physical group identifier 430 can be an identifier of a group of ports unique to the line card disposed within the physical slot. The group of ports associated with the physical group identifier 430 can be defined based on any suitable criteria. In some embodiments, for example, each port can be assigned to a physical group on a line card based on a protocol implemented by the port (e.g., Ethernet, Fibre Channel, etc.), based on a physical location of the port on a line card, based on a size of the port, based on a bandwidth of the port, based on a speed of the port, based on available processing capacity, and/or any other suitable criteria. In other embodiments, the ports can be assigned to a physical group randomly.

The physical port identifier 440 can be an identifier of a physical port within the group of ports unique to the group of ports. In some embodiments, for example, the physical port identifier 440 can identify a port (e.g., similar to ports 121-124, 131-134, 141-144 in FIGS. 1 and 4) within a group of ports associated with the physical group identifier 430. For example, in FIG. 1, if ports 123 and 124 define a group of ports within a line card having the ports 121-124, the port 123 can be distinguished from the port 124 by its physical port identifier 440. Similarly, the port 124 can be distinguished from the port 123 by its physical port identifier 440. Accordingly, each port can be globally and/or system wide identified based on its four layer unique physical identifier 400.

FIG. 6 is a schematic illustration of a logical identifier 500 of a port of an access switch, according to another embodiment. Such a logical identifier 500 can be associated with a logical topology of a switch fabric system. Similarly stated, each of the parameters and/or layers associated with the logical identifier 500 identifies a logical aspect, group and/or part of the switch fabric system.

The logical identifier 500 includes a logical slot identifier 510, a logical group identifier 520 and a logical port identifier 530. The logical slot identifier 510 can be associated with a logical slot (e.g., a first grouping of ports) of a network control entity within the switch fabric system. In some embodiments, for example, the ports associated with a network control entity can be divided and/or grouped into logical slots. In some embodiments, for example, each port is assigned to a single logical slot. Accordingly, the logical slot identifier 510 can be specific to a particular network control entity. Similarly stated, in some embodiments, the logical slot identifier 510 is unique within a particular network control entity but not globally unique across the entire switch fabric system (e.g., each network control entity can have a "slot 1").

The logical group identifier 520 can be associated with a group of ports (e.g., a second group of ports) within the same logical slot (e.g., the first group of ports). Similarly stated, each logical port can be associated with a group of ports (which can include one or more logical ports) within a logical slot (which can include one or more logical groups). Accordingly, each logical group identifier 520 can be unique for a particular logical slot. For example, each logical slot can include a "logical group 1." The logical port identifier 530 can be associated with a port within a logical group. Similarly stated, each logical port identifier 530 can be associated with a port assigned to a logical group (which can include one or more logical ports). The logical port identifier 530 can represent a physical port managed by a particular network control entity and within a particular logical slot and a logical group. The logical port identifier can be unique for a particular logical group. For example, each logical group can include a "logical port 1" that represents a different physical port.

Such logical groups and/or logical slots can be defined based on any suitable criteria. In some embodiments, for example, the ports can be assigned to a logical slot and/or group based on a protocol implemented by the port, based on a physical location of the port on a line card and/or access switch, based on a size of the port, based on a bandwidth of the port, based on a speed of the port, based on available processing capacity, and/or any other suitable criteria. In other embodiments, the ports can be assigned to a logical slot and/or group randomly.

In other embodiments, the logical ports within a network control entity can be divided into any number of logical slots and/or logical groups. For example, in some embodiments, a logical identifier does not include a logical slot identifier. In other embodiments, the logical identifier does not include either a logical slot identifier or a logical group identifier. In such embodiments, each port is associated with a logical port identifier unique to that network control entity.

FIG. 7 is a schematic illustration of a database 600 that stores an association between a physical identifier of a port, a network control entity and a logical identifier of the port. Similarly stated, the database 600 is a table and/or map that represents and/or maintains an association between a physical identifier and/or address (e.g., physical identifier 400 of FIG. 5), a network control entity identifier and/or address, and a logical identifier and/or address (e.g., logical identifier 500 of FIG. 6) of a port within a switch fabric system. In some embodiments, such a database 600 can be stored at a network management module. Accordingly, as described above and in further detail herein, based on the database 600, a network management module can translate a physical address of a port into a logical address of a port such that a network control entity can implement, execute and/or apply configuration information addressed to that port using a physical identifier, to that port.

The database 600 includes a physical chassis identifier 610 column, a physical slot identifier 620 column, a physical group identifier 630 column, a physical port identifier 640 column, a network control entity identifier 650 column and a logical identifier 660 column. Using the parameters of the physical identifier 400 (FIG. 5), the database 600 can determine and/or translate the physical identifier 400 into a network control entity identifier 650 and a logical identifier 660. For example, if the physical identifier associated with a port has a physical chassis identifier 610 of P Chassis 1, a physical slot identifier 620 of P Slot 1, a physical group identifier 630 of P Group 1, and a physical port identifier 640 of P Port 1, according to the database 600, the port is managed by a network control entity having a network control entity identifier 650 of NCE 1. Additionally, the port has a logical identifier 660 of L Slot 1, L Group 1 and L Port 1. Accordingly, configuration information addressed with a physical identifier of: P Chassis 1, P Slot 1, P Group 1, P Port 1, can be sent to the network control entity having a network control entity identifier 650 of NCE 1 along with the logical identifier 660 of: L Slot 1, L Group 1, L Port 1. The network control entity corresponding to network control entity identifier 650 of NCE 1 can implement, execute and/or apply the configuration information to the port identified by the logical identifier 660.

For another example, if the physical identifier associated with a port has a physical chassis identifier 610 of P Chassis 2, a physical slot identifier 620 of P Slot 3, a physical group identifier 630 of P Group 1, and a physical port identifier 640 of P Port 2, according to the database 600, the port is managed by the network control entity having a network control entity identifier 650 of NCE 5. Additionally, the port has a logical identifier 660 of L Slot 2, L Group 1 and L Port 4. Accordingly, configuration information addressed with a physical identifier of: P Chassis 2, P Slot 3, P Group 1, P Port 2, can be sent to the network control entity having a network control entity identifier 650 of NCE 5 along with the logical identifier 660 of: L Slot 2, L Group 1, L Port 4. The network control entity corresponding to the network control entity identifier 650 of NCE 5 can implement, execute and/or apply the configuration information to the port identified by the logical identifier 660.

As discussed above, in such a manner, configuration information having a physical identifier as an identifier and/or address can be sent to the correct network control entity such that the network control entity can identify with which port to associate the configuration information. Such a database 600 allows a user without knowledge of a logical topology of the switch fabric system to provide configuration information to the switch fabric system using a physical topology of the switch fabric system. As such, the user does not need to be aware of and/or concerned about the distributed logical topology of the control plane. Similarly stated, the user does not need to be aware of and/or concerned about which network control entity controls which port.

Moreover, the user does not need to be aware of and/or concerned about changes to the distributed logical topology of the control plane. For example, the user can provide configuration information to a port and/or group of ports of the switch fabric system based on the physical topology of the switch fabric system (i.e., using the physical identifier 400) even if the network control entity managing that port has changed. For example, when such a change occurs, the database 600 can be updated to reflect the new relationship between the physical topology and the logical topology. Additionally, as discussed above, because the logical topology of the control plane is not dependent on the physical topology of the switch fabric system, the user can maintain a physical topology of the switch fabric system similar to a physical topology of a legacy system used prior to the switch fabric system.

Figure 8:
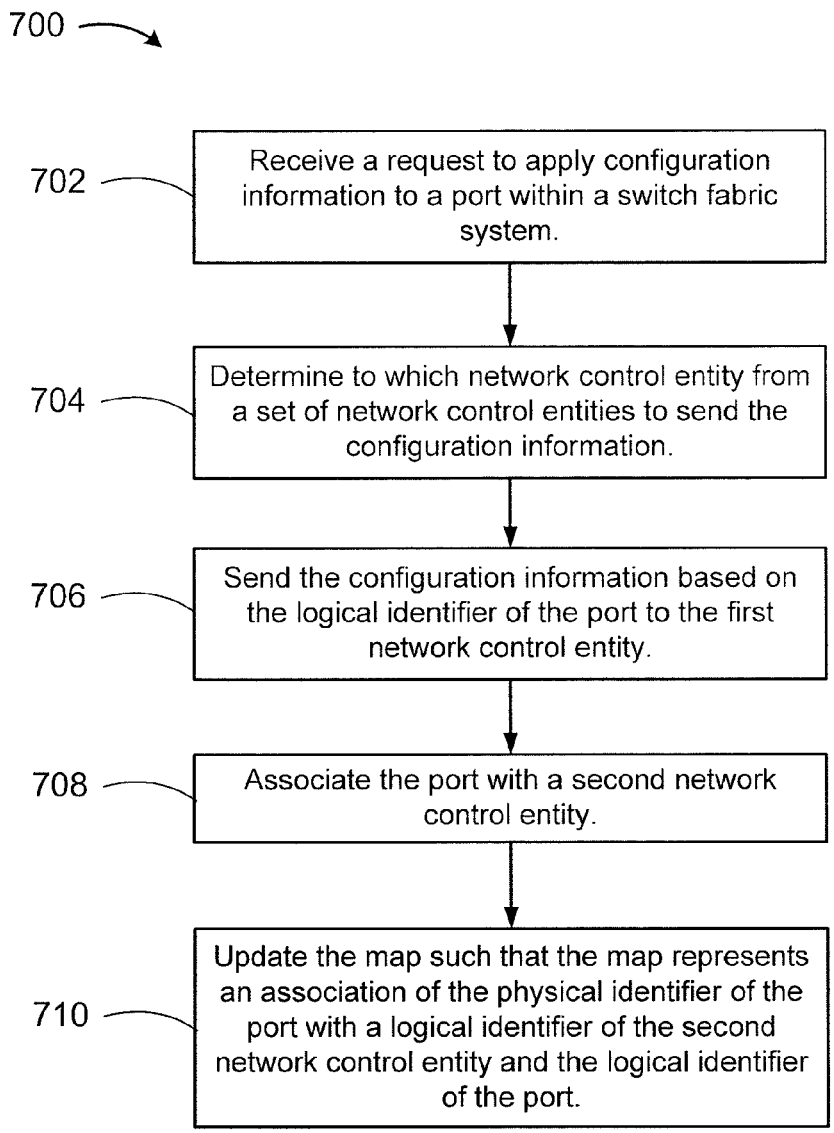
FIG. 8 is a flow chart illustrating a method of sending configuration information to a network control entity, according to another embodiment.

FIG. 8 is a flow chart illustrating a method 700 of sending configuration information to a network control entity, according to another embodiment. The method 700 includes receiving a request to apply configuration information to a port within a switch fabric system, at 702. Such a request can be provided to the switch fabric system by a user (e.g., a network administrator) of the system. The configuration information identifies the port using a physical identifier of the port associated with a physical topology of the switch fabric system. In some embodiments, such a user can manage the physical topology of the switch fabric system but does not control and/or manage the logical topology of the system. In some embodiments, the physical identifier can identify a physical location of the port within the switch fabric system. Such a physical identifier can be similar to the physical identifier 400 shown and described with respect to FIG. 5.

The method further includes determining to which network control entity from a set of network control entities to send the configuration information, at 704. Such a determination is based on a map that represents an association of the physical identifier of the port with a logical identifier of a first network control entity from the set of network control entities and a logical identifier of the port. Such a map can be similar to the database 600 shown and described with respect to FIG. 7.

The configuration information based on the logical identifier of the port is sent to the first network control entity, at 706. Based on the logical identifier of the port, the first network control entity can implement, execute, associate and/or apply the configuration information to the port. In some embodiments, the logical identifier can be similar to the logical identifier 500 shown and described with respect to FIG. 6.

In some embodiments, the network management module can change the network control entity with which a port is associated. For example, as shown in FIG. 8, the port is associated with a second network control entity, at optional 708. This can be a result of an available processing capacity of the first network control entity crossing an available capacity threshold. For example, based on the available processing capacity of the first network control entity, ports can be assigned to different network control entities (e.g., the second network control entity) and/or additional network control entities can be initiated and/or terminated to meet the processing demands of the switch fabric system. Such a change in the network control entity managing a particular port is a logical change in the control plane of the switch fabric system. Accordingly, the physical identifier (e.g., physical identifier 400 of FIG. 5) does not change and, thus, the user configuration (e.g., the user's view of the switch fabric system) does not change each time the logical topology of the switch fabric system changes.

The map is updated such that the map represents an association of the physical identifier of the port with a logical identifier of the second network control entity and the logical identifier of the port, at optional 710. Accordingly, when the network management module reassigns a port to another network control entity, the network management module can update the map accordingly. More specifically, the map can be modified and/or updated to store the association of the physical identifier of the port with the logical identifier of the second network control entity. Thus, in such a manner, the map can reflect the current logical topology of the switch fabric system.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

For example, while shown above as using a four-level physical identifier (i.e., a physical identifier with four parameters) and a three-level logical identifier (i.e., a logical identifier with three parameters), in other embodiments, any number of identifiers can be used in the database 600 (FIG. 7). In some embodiments, for example, each port within a chassis can include an identifier unique to that chassis. In such embodiments, the physical identifier can be a two-level identifier. For another example, the logical identifier includes only a logical port identifier. In such embodiments, each port associated with a network control entity can include a logical port identifier unique to that network control entity. In such embodiments, the logical identifier includes a single level and/or parameter.

While shown and described above as implementing, executing, associating and/or applying configuration information to a single port, in other embodiments, configuration information can be addressed such that the configuration information is applied to a group and/or set of ports. For example, a logical identifier and/or address can include a group of ports to which the configuration information is to be applied rather than a single port. For another example, the logical identifier and/or address can specify to apply the configuration information to every port associated with a given network control entity. In such an example, the configuration information can be used to associate the ports associated with the network control entity with a particular network segment (e.g., virtual local area network (VLAN)).

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules executing in hardware) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system, comprising:
a compute device to communicate with a first network control entity at a first access switch from a plurality of access switches that are coupled to each other via a switch fabric, the compute device to store a map between a physical identifier of a first port of the first access switch and both a logical identifier of the first network control entity and a logical identifier of the first port, the compute device to forward to the first network control entity, based on the map, configuration information that references the first port by the logical identifier of the first port, the compute device configured to send, to a second network control entity at a second access switch from the plurality of access switches and in response to a request, configuration information that references a second port of the first access switch by a logical identifier of the second port of the first access switch, the logical identifier of the second network control entity and the logical identifier of the second port being concealed from a first user submitting the request, and the physical identifier of the first port being managed by the first user, the logical identifier of the first port being managed by a second user different from the first user.

2. The system of claim 1, wherein the compute device is to forward the configuration information that references the first port to the first network control entity such that the network control entity associates the first port of the first access switch with a network segment based on the configuration information that references the first port.

3. The system of claim 1, wherein the physical identifier of the first port has a greater number of parameters than the logical identifier of the first port.

4. The system of claim 1, wherein the compute device is to forward the configuration information that references the second port to the second network control entity such that the second network control entity associates a network policy with the second port of the first access switch based on the configuration information that references the second port.

5. The system of claim 1, wherein the compute device is to receive the configuration information that references the second port from the first user of the system.

6. The system of claim 1, wherein a user of the system need not update configuration information in response to a change in a logical topology of the system.

7. A non-transitory processor-readable medium storing code representing instructions to cause a processor to:

receive a request to apply first configuration information to a first port at a first access switch from a plurality of access switches within a switch fabric system, the first configuration information identifying the first port using a physical identifier of the first port, the physical identifier of the first port being associated with a physical topology of the switch fabric system;

determine to which network control entity from a plurality of network control entities to send the first configuration information based on a map that represents an association of the physical identifier of the first port with a logical identifier of a first network control entity from the plurality of network control entities and a logical identifier of the first port, the plurality of network control entities being physically located at the plurality of access switches send the first configuration information to the first network control entity; and send, to a second network control entity from the plurality of network control entities and at a second access switch from the plurality of access switches, second configuration information, the second configuration information referencing a second port of the first access switch by a logical identifier of the second port of the first access switch, the logical identifier of the first network control entity and the logical identifier of the first port being concealed from a first user submitting the request, the physical identifier of the first port being managed by the first user, the logical identifier of the first port being managed by a second user different from the first user.

8. The non-transitory processor-readable medium of claim 7, further comprising code representing instructions to cause the processor to:

associate the first port with the second network control entity; and update the map such that the map represents an association of the physical identifier of the first port with a logical identifier of the second network control entity and the logical identifier of the first port.

9. The non-transitory processor-readable medium of claim 7, wherein the map represents an association of a physical identifier of the second port at the first access switch with a logical identifier of the second network control entity from the plurality of network control entities and the logical identifier of the second port.

10. The non-transitory processor-readable medium of claim 7, wherein the first network control entity associates the first port with a network segment based on the first configuration information.

11. The non-transitory processor-readable medium of claim 7, wherein the first network control entity executes a network policy based on the first configuration information.

12. The non-transitory processor-readable medium of claim 7, wherein the map represents an association of a physical identifier of the second port at the first access switch with a logical identifier of the second network control entity and the logical identifier of the second port.

13. A system, comprising:

a plurality of network control entities, each network control entity from the plurality of network control entities to manage at least one physical port from a plurality of physical ports within a switch fabric system, each physical port from the plurality of physical ports being associated with a physical identifier associated with a physical topology of the switch fabric system;

a network management module to associate each logical port from a plurality of logical ports to a physical port from the plurality of physical ports, the network management module to store a table having a map between (1) the physical identifier of each physical port from the plurality of physical ports and (2) a logical identifier of its associated logical port from the plurality of logical ports, each logical identifier being associated with a logical topology of the switch fabric system, the network management module to forward, based on the table, configuration information that references a first physical port from the plurality of physical ports using the logical identifier of a first logical port from the plurality of logical ports to a first network control entity (1) at a first access switch, (2) from the plurality of network control entities and (3) associated with the logical identifier of the first logical port from the plurality of logical ports, the first logical port being associated with the first physical port; and a compute device configured to send, to a second network control entity at a second access switch and in response to a request, configuration information that references a second physical port from the plurality of physical ports using a logical identifier of a second logical port from the plurality of logical ports and associated with the second physical port, the logical identifier of the second network control entity and the logical identifier of the second logical port being concealed from a first user submitting the request, the plurality of physical ports being managed by the first user, the plurality of logical ports being managed by a second user different from the first user.

14. The system of claim 13, wherein the first network control entity from the plurality of network control entities executes the configuration information that references the first physical port at the first logical port.

15. The system of claim 13, wherein each network control entity from the plurality of network control entities is to be physically located at an access switch from a plurality of access switches including the first access switch and the second access switch.

16. The system of claim 13, wherein the first network control entity is to associate the first logical port from the plurality of logical ports with a network segment based on the configuration information that references the first physical port.

17. The system of claim 13, wherein the first network control entity is to manage the first logical port, the second network control entity from the plurality of network control entities to manage the second logical port from the plurality of logical ports.

18. The system of claim 13, wherein each physical port from the plurality of physical ports is to be operatively coupled to a peripheral processing device from a plurality of peripheral processing devices.

* * * * *